(12) United States Patent
Endo

(10) Patent No.: US 6,863,948 B2
(45) Date of Patent: Mar. 8, 2005

(54) DISK-SHAPED MAGNETIC RECORDING MEDIUM

(75) Inventor: Yasushi Endo, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 10/303,902

(22) Filed: Nov. 26, 2002

(65) Prior Publication Data

US 2003/0099804 A1 May 29, 2003

(30) Foreign Application Priority Data

Nov. 26, 2001 (JP) ......................................... 2001-359290

(51) Int. Cl.⁷ ................................................. G11B 5/82
(52) U.S. Cl. ................ 428/65.3; 428/66.7; 428/694 SG
(58) Field of Search ............................. 428/66.7, 65.3, 428/694 SG

(56) References Cited

U.S. PATENT DOCUMENTS

| | | | | |
|---|---|---|---|---|
| 3,373,413 A | * | 3/1968 | Treseder | 360/99.01 |
| 4,578,299 A | * | 3/1986 | Kato et al. | 428/65.4 |
| 4,581,270 A | * | 4/1986 | Kato et al. | 428/65.4 |
| 5,061,537 A | * | 10/1991 | Kobayashi et al. | 428/65.4 |
| 5,733,622 A | * | 3/1998 | Starcke et al. | 428/64.1 |
| 6,424,488 B1 | * | 7/2002 | Misso et al. | 360/98.08 |

* cited by examiner

Primary Examiner—Stevan A. Resan
(74) Attorney, Agent, or Firm—Sughrue Mion, PLLC

(57) ABSTRACT

A disk-shaped magnetic recording medium for use in a small magnetic disk cartridge, comprising a flexible disk-shaped magnetic sheet, and a rigid annular member attached to the outer circumferential edge portion of one side of the magnetic sheet.

6 Claims, 4 Drawing Sheets

DISK-SHAPED MAGNETIC RECORDING MEDIUM

BACKGROUND OF THE INVENTION

1. Field of the Invention

The present invention relates to a disk-shaped magnetic recording medium that is rotatably housed in a small magnetic disk cartridge.

2. Description of the Related Art

To record or reproduce information, a recording medium is removably loaded in the card slot of electronic equipment such as a digital still camera, a digital video camera, a laptop personal computer (PC), etc. Examples of such recording media that have been put to practical use are a semiconductor memory type, a hard disk type, an optical disk type, a magnetic disk type (e.g., a floppy disk type), etc.

Among these recording media, semiconductor memories are most widely used because they are easy to handle and have a relatively large recording capacity. However, they are relatively expensive. Because of this, in digital cameras employing the semiconductor memory, the photographed image data is transferred to a PC and stored, the data is deleted from the memory, and the semiconductor memory is repeatedly used.

Although there are hard disks that can store 340 megabytes (MB) of data or 1 gigabyte (GB) of data, they are also expensive. Because of this, data is transferred to another device and stored, and hard disks are repeatedly used.

Optical disks have a large recording capacity for their size. For example, an optical disk with a size of 35 mm×41 mm×11 mm can store 256 MB of data. Optical disks with a recording capacity of 512 MB are about to be realized. However, optical disks have the disadvantage that the recording speed is slow, because the writing time is time-consuming.

Meanwhile, there are known some magnetic disks (e.g., floppy disks) of a small size of 50 mm×55 mm×2 mm. Such a small magnetic disk can be exchangeably loaded in a disk drive of a size that can be inserted into the card slot of a PC, etc. However, the recording capacity is as small as 40 MB and insufficient to record image data photographed by a camera. In addition, the size is not suitable for digital cameras.

With the spread of PCs, digital cameras have spread rapidly in recent years because of the simplicity of recording, enhancement in picture quality due to the development of imagers, possibility of data deletion and transmission, recording capacity size, etc. However, the method of use is restricted, because recording media are limited in cost and recording capacity, as described above. For instance, since recording media are very expensive, a single camera has only a single recording medium, which is repeatedly used. That is, when the recording medium is filled with data, the data is transferred to a PC and deleted from the recording medium as described above. Because of this, there are cases where the recording medium is filled up during a trip. In addition, the recording medium cannot be stored as is, containing data therein, nor can it be given away to a person.

Hence, there is a demand for realization of a recording medium which is large in recording capacity, low in cost, and small in size so that the data photographed by a digital camera can be stored as is or given away to a person. In PCs, there is also a demand for realization of a recording medium which is large in recording capacity, low in cost, and small in size so that the medium with stored data can be handed to a person.

To meet the aforementioned demands, it is contemplated that the above-described inexpensive small large-capacity recording medium may comprise a card-type disk drive which is loaded in electronic equipment such as a PC and a digital camera, and a magnetic disk cartridge which is loaded in the small disk drive. That is, it is contemplated that such a magnetic disk cartridge may include a housing in which a flexible magnetic disk capable of high-density recording is rotatably housed, and have a recording capacity of 200 MB or larger. Examples of magnetic recording media with a high recording density are a recording medium with a thin metal film formed by vapor deposition, a recording medium with a thin metal film formed by sputtering, and a recording medium employing barium ferrite powder or ferromagnetic magnetic powder. An example of a magnetic recording medium with a high recording density employing barium ferrite powder is disclosed in U.S. patent application Ser. No. 10/266,584.

The "magnetic recording medium with a high recording density employing barium ferrite powder" is a magnetic disk containing barium ferrite powder in its magnetic layer, and employs a material capable of a high recording density. The magnetic disk may comprise a magnetic recording medium disclosed. The magnetic recording medium has a non-magnetic layer which includes both non-magnetic powder and a binder, and a magnetic layer which includes both ferromagnetic powder (which is ferromagnetic metal powder or hexagonal-system ferrite powder) and a binder. The non-magnetic layer and the magnetic layer are formed on at least one surface of a non-magnetic substrate in the recited order. In the non-magnetic layer, the quantity of carbon black whose average particle diameter is 10 to 30 nm is 10 to 50 weight parts with respect to 100 weight parts of the aforementioned non-magnetic powder. The thickness of the magnetic layer is 0.2 $\mu$m or less. According to a microanalysis by an electron beam, the standard deviation (b) of the strength of an element with respect to an average strength (a) resulting from ferromagnetic powder is $0.03 \leq b/a \leq 0.4$. The center plane average roughness Ra of the magnetic layer is 5 nm or less, and the 10-point average roughness Rz is 40 nm or less. In a magnetic disk employing the above-described material, information is recorded or reproduced by a magnetic head such as an MR head capable of a high recording density.

The above-described magnetic recording medium can realize a recording capacity of 200 MB or larger, preferably 500 MB or larger. Therefore, if a still image has 1 MB of data 500 MB or larger. Therefore, if a still image has 1 MB of data per image, the magnetic recording medium can store 500 images. In the case of a motion picture, the magnetic recording medium can store image contents of about 30 minutes. Thus, the magnetic recording medium can store a motion picture photographed by a digital camera or a motion picture transmitted by a portable telephone. As a result, users can conveniently use the magnetic recording medium. Furthermore, the magnetic recording medium can be conveniently used in PCs as an inexpensive large-capacity recording medium. Thus, the convenience is great.

Card-type disk drives are employed in electronic equipment such as PCs, digital cameras, etc. In the case of PCs, as shown in FIG. 5A, a disk drive 6 is connected electrically with the socket 4 of a card 2 that is inserted in the card slot of a PC. In the case of small electronic equipment such as a digital camera 3 shown in FIG. 5B, a disk drive 6 is connected electrically with the socket of the receiving portion 5 of the camera 3. Therefore, the disk drive 6 is extremely small in size and has, for example, a length of 38 to 55 mm, a width of 35 to 51 mm, and a thickness of 3 to 5 mm. A magnetic disk cartridge 8 is inserted into the disk drive 6 through a slot formed in the disk drive 6, and has, for example, a length and a width of 25 to 36 mm and a thickness of 1 to 3 mm.

To achieve the above-described high recording density, it is necessary that a magnetic head touch the magnetic recording medium stably. In the case where a flexible recording sheet is employed as the magnetic recording medium, the gap between the magnetic sheet and the magnet head varies due to the so-called flutter of the magnetic sheet being rotated. Because of this, there is a problem that recording-reproduction characteristics will degrade. With a reduction in the pitch between recording tracks, there is another problem that the position of a recording track in the radial direction of the disk will be slightly shifted or fluctuated.

SUMMARY OF THE INVENTION

The present invention has been made in view of the above-described circumstances. Accordingly, it is an object of the present invention to provide a disk-shaped magnetic recording medium in which a magnetic head can touch a flexible magnetic sheet stably by preventing the flutter of the flexible magnetic sheet during rotation. Another object of the invention is to provide a method of manufacturing the disk-shaped magnetic recording medium.

To achieve the aforementioned objects of the present invention and in accordance with the present invention, there is provided a first disk-shaped magnetic recording medium for use in a small magnetic disk cartridge, comprising:

a flexible disk-shaped magnetic sheet; and a rigid annular member attached along the outer circumferential edge portion of one side of the magnetic sheet.

In addition, in accordance with the present invention, there is provided a second disk-shaped magnetic recording medium for use in a small magnetic disk cartridge, comprising:

a flexible disk-shaped magnetic sheet; and two rigid annular members attached along the outer circumferential edge portions of both sides of the magnetic sheet.

In the first and second magnetic recording media of the present invention, the aforementioned annular member may be prefabricated to be of substantially the same outer diameter as the magnetic sheet and adhesively attached thereto. The aforementioned two annular members may alternatively be attached to the outer circumferential edge portions by hardening liquid resin formed on the outer circumferential edge portions with ultraviolet rays.

In the first and second magnetic recording media of the present invention, it is preferable that the aforementioned annular members be formed from a material whose sliding resistance is low with respect to an interior wall surface of the magnetic disk cartridge.

The first disk-shaped magnetic recording medium of the present invention may further comprise an annular member coaxially attached to an inner circumferential portion of one side of the magnetic sheet. The second disk-shaped magnetic recording medium of the present invention may further comprise two annular members coaxially attached to inner circumferential portions of both sides of the magnetic sheet.

Further in accordance with the present invention, there is provided a method of manufacturing a disk-shaped magnetic recording medium for use in a small magnetic disk cartridge, comprising the steps of:

preparing a flexible disk-shaped magnetic sheet;

rotating the magnetic sheet; and forming a rigid annular member on a circumferential edge portion of the magnetic sheet by administering liquid resin on the circumferential edge portion while curing said resin with ultraviolet rays.

In the above-described method, the aforementioned liquid resin may be formed on the circumferential edge portion by being dropping on the circumferential edge portion. The liquid resin may also be formed on the circumferential edge portion by being coated on the circumferential edge portion.

According to the disk-shaped magnetic recording medium of the present invention, the flexible disk-shaped magnetic sheet is equipped with the rigid annular member along the outer circumferential edge portion of the sheet. Therefore, the flutter of the magnetic sheet being rotated can be minimized by the centrifugal force of the annular member that occurs during rotation. As a result, the disk-shaped magnetic recording medium of the present invention has the advantage that the magnetic heads in a disk drive can touch both sides of the magnetic disk stably.

In addition, the presence of the annular member can prevent the magnetic sheet from contacting the interior wall surface of the housing of the cartridge. Therefore, even when the cartridge undergoes vibration during transportation, for instance, the magnetic sheet can be prevented from contacting the interior surface and liner of the cartridge housing.

Furthermore, by coaxially attaching a similar annular member to the inner circumference of the magnetic recording medium, the above-described advantages can be further enhanced.

According to the above-described manufacturing method of the present invention, the rigid annular member can be formed by applying liquid ultraviolet-ray hardening resin to the outer circumferential edge portion of the magnetic sheet while irradiating ultraviolet rays to the outer circumferential edge portion, during the rotation of the magnetic sheet. In this way, the liquid ultraviolet-ray hardening resin applied to the circumferential edge portion of the magnetic sheet can be applied uniformly over the entire circumference of the magnetic sheet by the centrifugal force that results from rotation of the magnetic sheet. At the same time, the resin can be hardened by irradiation of ultraviolet rays. As a result, a dynamically balanced rigid annular member can be formed along the circumferential edge portion of the magnetic sheet.

BRIEF DESCRIPTION OF THE DRAWINGS

The present invention will be described in further detail with reference to the accompanying drawings wherein.

DESCRIPTION OF THE PREFERRED EMBODIMENT

Figure 1:
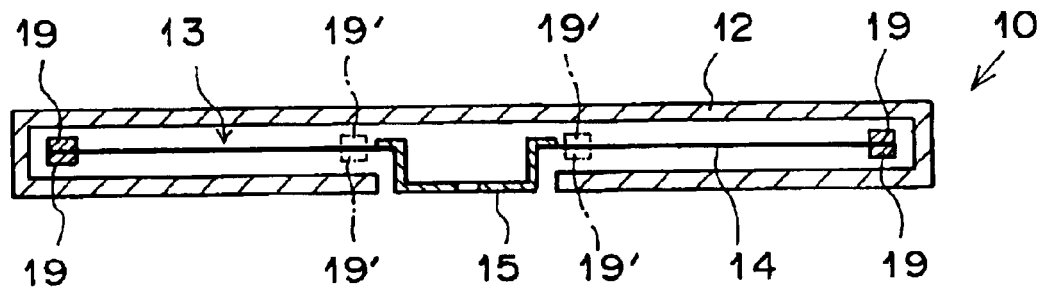
FIG. 1 is a schematic sectional view showing a magnetic disk cartridge in which a magnetic recording medium constructed in accordance with a preferred embodiment of the present invention is housed.
Figure 5A:
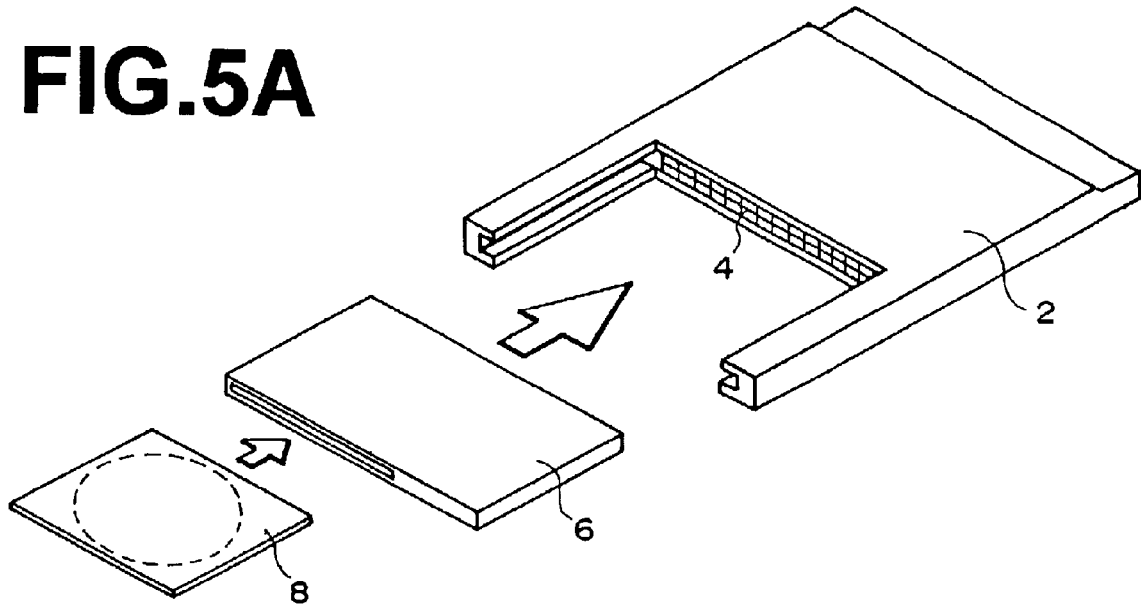
FIGS. 5A and 5B are diagrams showing a small magnetic disk cartridge on which the present invention is based, and electronic equipment with a card slot in which a disk drive for the magnetic disk cartridge is loaded.
Figure 5B:
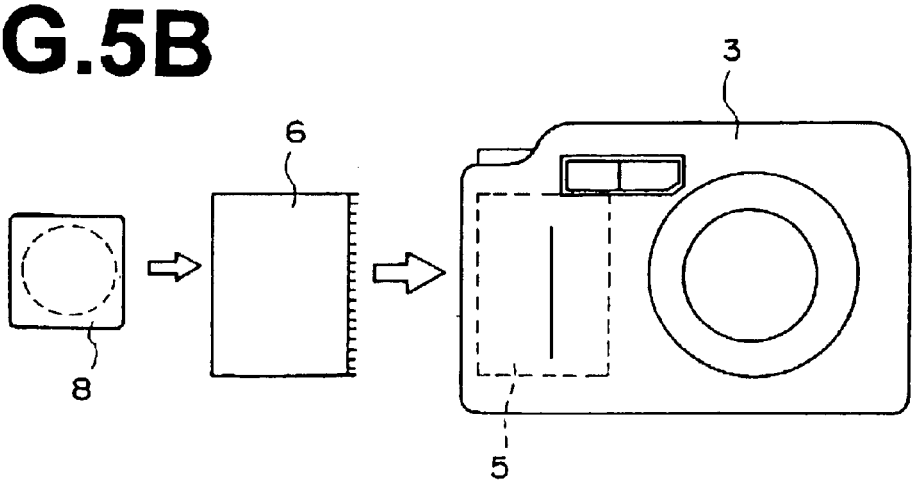

Referring now to FIG. 1, there is shown a magnetic disk cartridge 10 with a housing 12. Within the housing 12, a disk-shaped magnetic recording medium 13 is rotatably supported. The magnetic recording medium 13 is constructed of a flexible magnetic sheet 14. A center core 15 is fixedly attached to the central portion of the magnetic sheet 14. Annular members 19, 19 are attached to the outer circumferential edge portions of both sides of the magnetic sheet 14, respectively. When the magnetic disk cartridge 10 is loaded in a disk drive such as the disk drive 6 shown in FIG. 5, the center core 15 is magnetically attracted and rotated by a driving member provided in the disk drive 6. The annular members 19, 19 are preferably formed from a material whose sliding resistance is low with respect to the interior wall surface of the housing 12. Note that the magnetic disk cartridge 10 is equipped with openings (not shown) and a shutter (not shown) that opens and closes to expose both sides of the magnetic recording medium 13 through the openings. Since they do not form part of the present invention, a detailed description of them will not be given.

Figure 2:
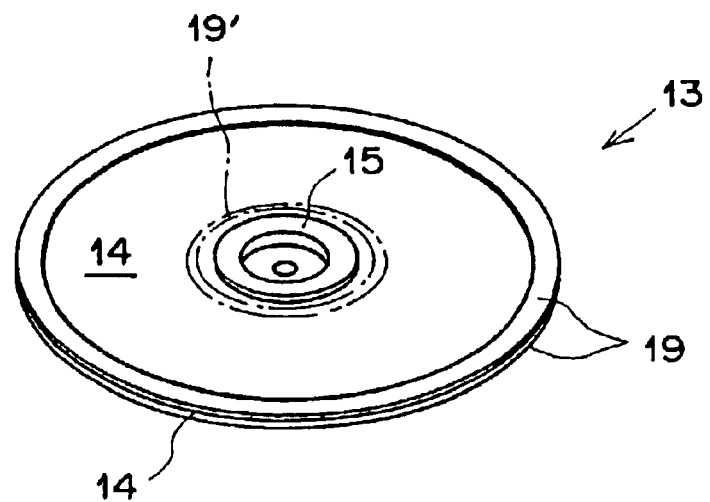
FIG. 2 is a perspective view of the magnetic recording medium shown in FIG. 1.

In addition to the above-described outer annular members 19, 19, the magnetic recording medium 13 may be equipped with inner annular members 19', 19' which are attached to the inner circumferential portions of both sides of the magnetic sheet 14, as shown by phantom lines in FIGS. 1 and 2. While the two outer annular members 19, 19 are attached to both sides of the magnetic sheet 14, one outer annular member 19 may be attached to one side of the magnetic sheet 14.

Figure 3:
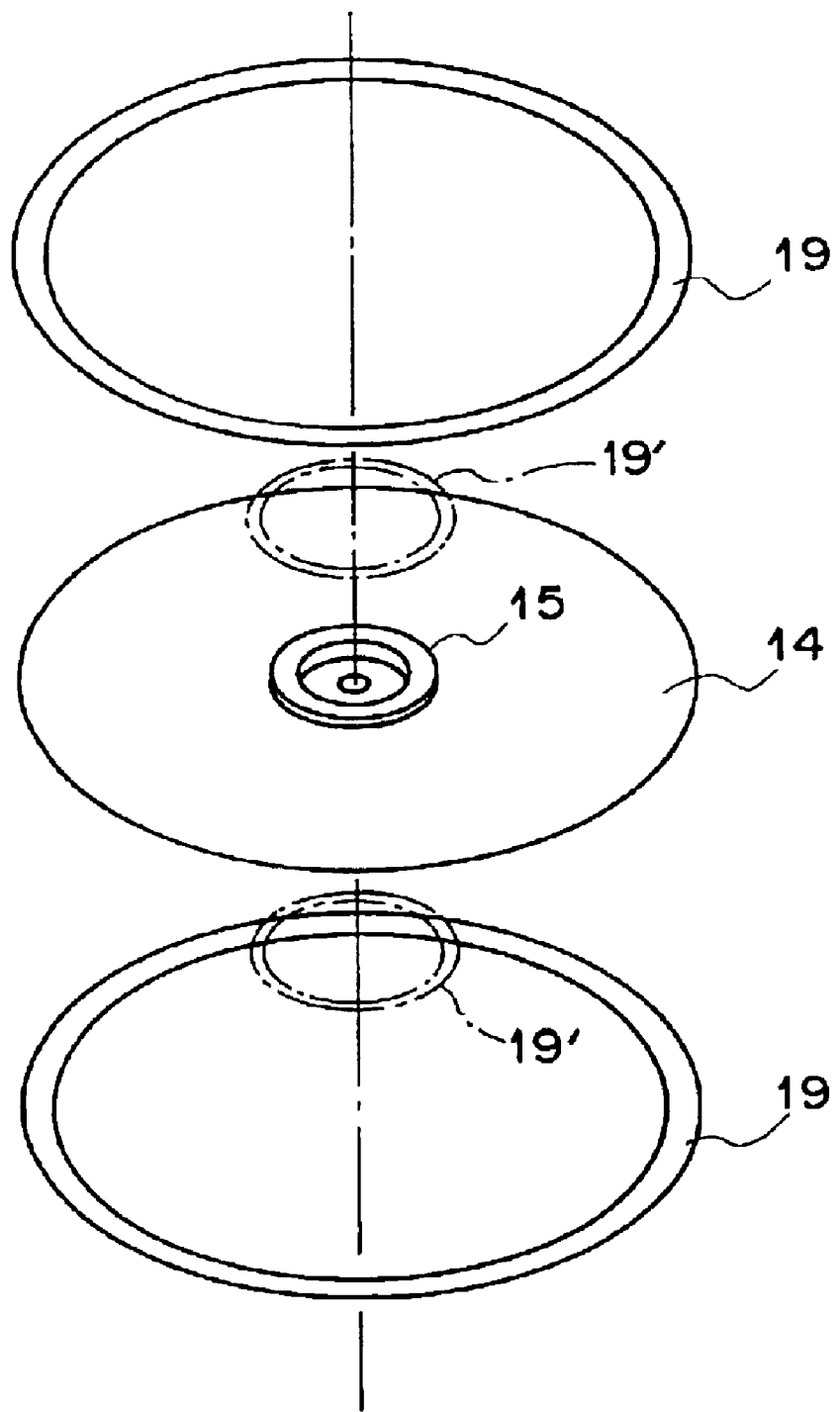
FIG. 3 is an exploded perspective view of the magnetic recording medium shown in FIG. 2.

The rigid annular member 19 (or 19') can be attached to the magnetic sheet 14 by an adhesive, etc., as shown in FIG. 3.

According to the disk-shaped magnetic recording medium 13 of the preferred embodiment, the flexible disk-shaped magnetic sheet 14 is equipped with the rigid annular member 19 along the outer circumferential edge portion of the sheet 14. Therefore, the flutter of the magnetic sheet 14 being rotated can be minimized by the centrifugal force of the annular member 19 that occurs during rotation. As a result, the disk-shaped magnetic recording medium 13 of the preferred embodiment has the advantage that the magnetic heads in the disk drive 6 can touch both sides of the magnetic disk 14 stably. In addition, the presence of the annular member 19 (and 19') can prevent the magnetic sheet 14 from contacting the interior wall surface of the housing 12 of the cartridge 10. Therefore, even when the cartridge 10 undergoes vibration during transportation, for instance, the magnetic sheet 14 can be prevented from contacting the interior surface and liner of the housing 12.

Figure 4:
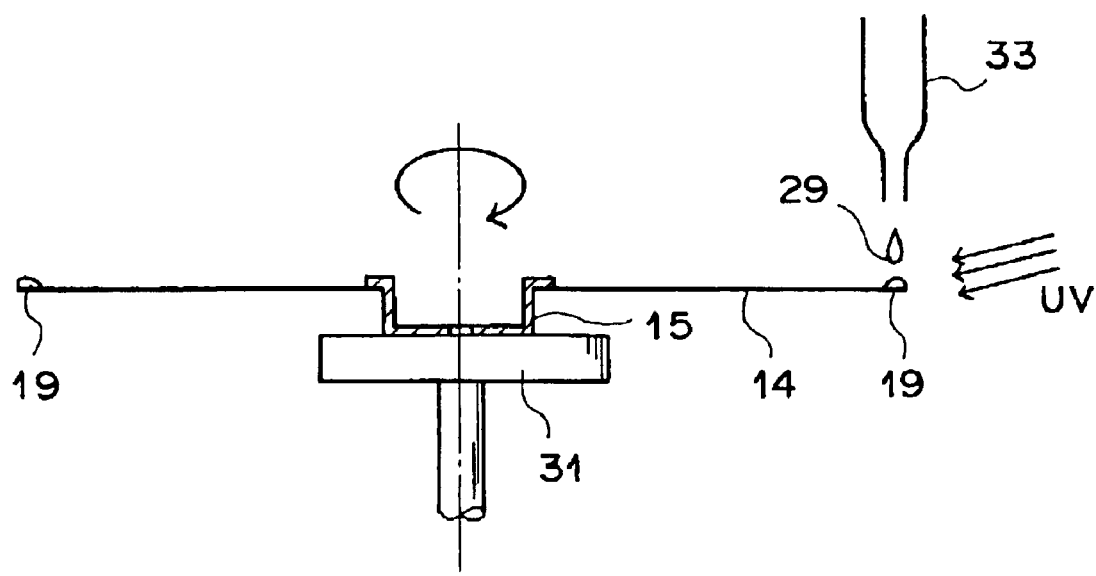
FIG. 4 is a diagram used to explain how the magnetic recording medium is formed.

FIG. 4 shows a method of forming the rigid annular member 19 along the outer circumferential edge portion of the magnetic sheet 14. In this method, the center core 14 of the magnetic sheet 14 is first placed on a rotating table 31 and magnetically fixed to the rotating table 31. Then, the magnetic sheet 14 is rotated. During the rotation of the magnetic sheet 14, the rigid annular member 19 can be formed by dropping or applying liquid ultraviolet-ray hardening resin 29 to the outer circumferential edge portion of the magnetic sheet 14 while irradiating ultraviolet rays to the outer circumferential edge portion. In this way, the liquid ultraviolet-ray hardening resin 29 applied to the circumferential edge portion of the magnetic sheet 14 can be applied uniformly over the entire circumference of the magnetic sheet 14 by the centrifugal force that results from rotation of the magnetic sheet 14. At the same time, the resin 29 can be hardened by irradiation of ultraviolet rays. As a result, the rigid annular member 19 dynamically balanced can be formed along the circumferential edge portion of the magnetic sheet 14.

While the present invention has been described with reference to the preferred embodiment thereof, the invention is not to be limited to the details given herein, but may be modified within the scope of the invention hereinafter claimed.

What is claimed is:

1. A disk-shaped magnetic recording medium for use in a small magnetic disk cartridge, comprising:

a flexible disk-shaped magnetic sheet; and an annular member attached directly to an outer circumferential edge portion of one side of said magnetic sheet, wherein said annular member is ultraviolet ray-hardened liquid resin wherein said annular member has an uncovered upper surface opposite to a surface which is directly attached to said magnetic sheet.

2. The disk-shaped magnetic recording medium as set forth in claim 1, wherein said annular member is formed from a material whose sliding resistance is low with respect to an interior wall surface of said magnetic disk cartridge.

3. The disk-shaped magnetic recording medium as set forth in claim 1, further comprising an annular member coaxially attached to an inner circumferential portion of one side of said magnetic sheet.

4. A disk-shaped magnetic recording medium for use in a small magnetic disk cartridge, comprising:

a flexible disk-shaped magnetic sheet; and two annular members attached directly to outer circumferential edge portions of both sides of said magnetic sheet, wherein said annular members are ultraviolet ray-hardened liquid resin;

wherein each of said annular members have an uncovered upper surface opposite to a surface which is directly attached to said magnetic sheet.

5. The disk-shaped magnetic recording medium as set forth in claim 4, wherein said two annular members are formed from a material whose sliding resistance is low with respect to an interior wall surface of said magnetic disk cartridge.

6. The disk-shaped magnetic recording medium as set forth in claim 4, further comprising two annular members coaxially attached to inner circumferential portions of both sides of said magnetic sheet.

* * * * *